United States Patent [19]

Christ et al.

[11] 4,434,373
[45] Feb. 28, 1984

[54] NEUTRON SHIELDING

[76] Inventors: Richard Christ, August-Bebel-Strasse 20, 6454 Bruchköbel, Fed. Rep. of Germany; Hartmut Kroll, Gaussstrasse 6, 6450 Hanau, Fed. Rep. of Germany

[21] Appl. No.: 431,100

[22] Filed: Sep. 30, 1982

Related U.S. Application Data

[63] Continuation of Ser. No. 206,675, Nov. 13, 1980, abandoned.

[30] Foreign Application Priority Data

Nov. 17, 1979 [DE] Fed. Rep. of Germany ... 7932528[U]

[51] Int. Cl.$^3$ .............................................. G21F 5/00
[52] U.S. Cl. ............................... 250/506.1; 250/518.1
[58] Field of Search ............... 250/506, 507, 518, 519; 376/272

[56] References Cited

U.S. PATENT DOCUMENTS

| | | | |
|---|---|---|---|
| 3,727,060 | 4/1973 | Blum | 250/506 |
| 3,828,197 | 8/1974 | Boldt | 250/506 |
| 4,339,411 | 7/1982 | Knackstalt et al. | 250/506 |

Primary Examiner—Bruce C. Anderson
Attorney, Agent, or Firm—Cushman, Darby & Cushman

[57] ABSTRACT

For the conveying and storage of radioactive materials there are needed containers which shield γ and neutron-radiation and draw off the heat of decay whereby there is desired a variable neutron shielding. This is obtained by a neutron shielding between the cooling fins of the container is formed as an elastic molded body.

7 Claims, 3 Drawing Figures

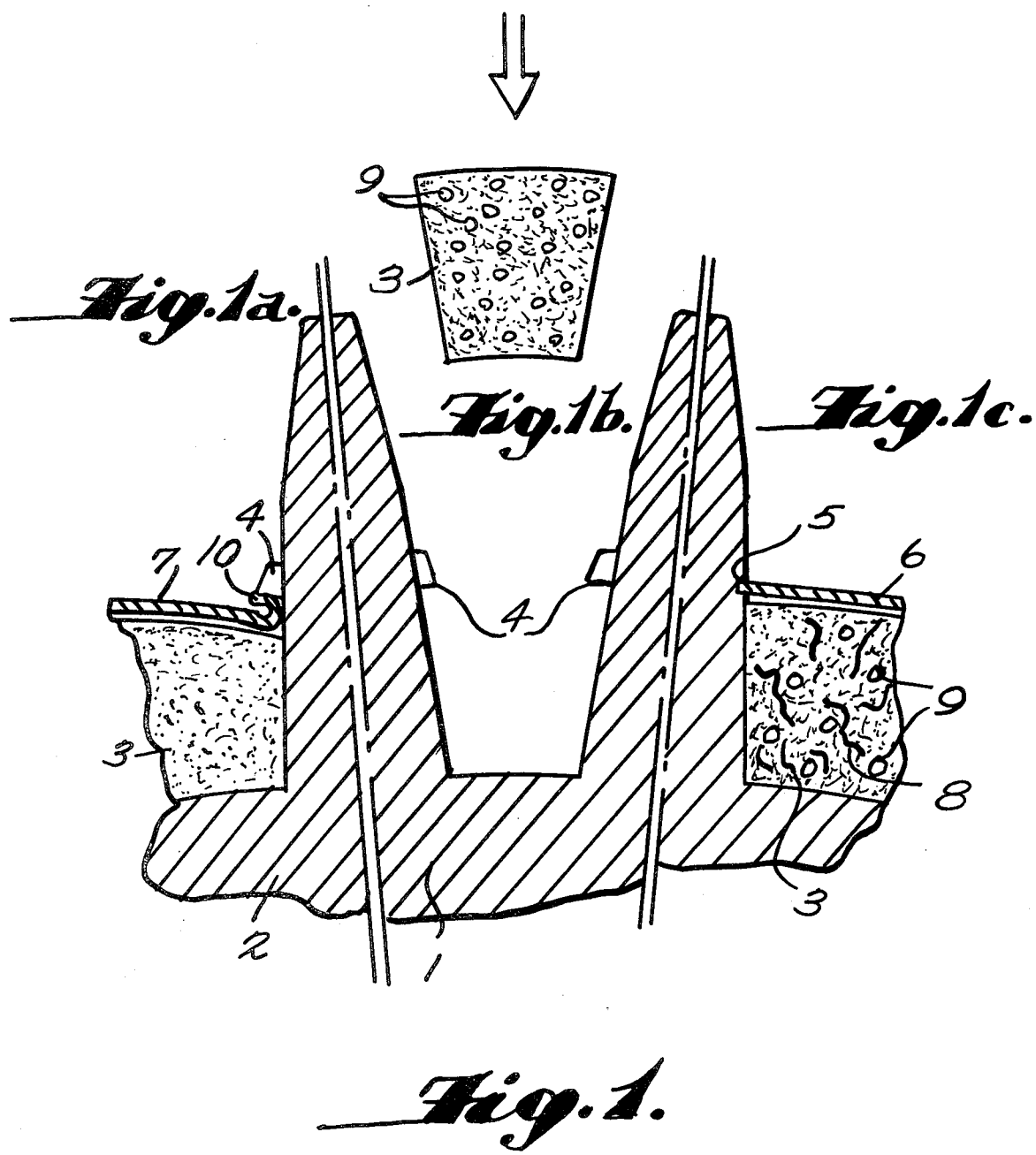

NEUTRON SHIELDING

This is a continuation of application Ser. No. 206,675 filed Nov. 13, 1980, abandoned.

BACKGROUND OF THE INVENTION

The invention is directed to a conveying and/or storage container for radioactive materials which produce γ and neutron-radiation emissions and noteworthy residual heat, essentially consisting of a container body having shielding function for γ-radiation, a neutron shielding and cooling fins whereby the neutron shielding is arranged between the bar shaped fins.

Containers which are employed for conveying and/or storing spent fuel elements must safely confine the radioactivity of the inserted material and demonstrate in strength tests that this is also guaranteed in extreme accident situations. However, simultaneously they must also shield off the gamma and neutron rays which are set free in the radioactive decay reactions and carry off the heat of decay to the outside.

Known shielding containers generally consist of a metallic base container with the required mechanical strength and the required wall thickness for shielding the gamma rays and are customarily made of steel or a combination of lead and steel with an outer shell of neutron shielding material, generally small polyethylene spheres cast in synthetic resin.

It is disadvantageous in these constructions that even slight collisions of the containers, which can occur even in routine operation, can lead to damage of the heat conducting fins and the resin layer and accordingly require an expensive repair of the entire container.

Other constructions indeed avoid synthetic resins but are disadvantageous in regard to contamination and corrosion because of the gaps remaining on the cooling fins.

Therefore it was the problem of the present invention to produce a conveying and/or storage container for radioactive materials which emit γ and neutron-radiation and mentionable heat of decay consisting essentially of a container body having a shielding function off γ-radiation, neutron shielding and cooling fins, whereby the neutron shielding is arranged between the bar shaped cooling fins, in which the neutron shielding should be replaceable and easy to maintain and avoid the described disadvantages.

SUMMARY OF THE INVENTION

This problem was solved according to the invention by forming the neutron shielding as an elastic molded body.

BRIEF DESCRIPTION OF THE DRAWING

FIG. 1 including 1a, 1b, and 1c is a schematic illustration of a shielding container according to the invention;

In FIG. 1, FIG. 1a shows the neutron shielding in place, FIG. 1b shows the manner of placing the neutron shielding in place and FIG. 1c shows neutron shielding in place and containing finely divided metal pieces.

In the drawings like numerals refer to like parts.

The container of the invention can comprise, consist essentially of or consist of the stated elements.

DETAILED DESCRIPTION

Referring more specifically to the drawings, FIGS. 1a–1c, the neutron shielding 3 of the invention is disposed between the bar shaped cooling fins or flanges 1 which are located on the container body 2. This neutron shielding 3 consists essentially of elastic material with a high hydrogen and/or carbon portion and with rubber like mechanical properties. Illustrative of such materials are natural rubber, butadiene-styrene copolymer and poly cis isoprene. The shielding 3 is pressed between the cooling fins and is fitted tightly to them. Because of its force fit, the neutron shielding 3 includes material for the transmission of heat. Particularly advantageous for this purpose are metal chips, metal powder and whiskers 8 which are worked into the neutron shielding 3. Illustrative of such metals are iron and steel. Furthermore, it has proven particularly favorable to mix good neutron absorbing powders 9 into the neutron shielding 3. Among such powders there are included, among other, boron and the rare earths, above all, gadolinium and samarium, and the compounds of boron and the rare earths, preferably gadolinium and samarium, for example, boron oxide, gadolinium oxide and samarium oxide.

It is particularly advantageous to mount bosses 4 on the cooling fins 1. These bosses 4, which can also be molded or cast on the fins 1 of the invention secure the elastic neutron shielding 3 pressed between the cooling fins 1. In an advantageous refinement of the invention, the neutron shielding 3 is covered and protected by a covering 7. The covering 7 is applied to the boss 4 with clamping elements 10. However, there can also be employed bolts, etc. In many cases, it is particularly advantageous to make the covering 7 of neutron absorbing steel.

In a further refinement there are formed on the cooling fins 1 pinhole or groove like recesses 5. With the former they can be locked with safety rods 6 provided with springs, with the latter the locking is readily possible by a suitable covering 7.

It is within the invention to fill up the remaining gaps with suitable water repelling plastic materials.

The invention is outstandingly suited not only for bar shaped longitudinal fins but also for bar shaped transverse fins.

The entire disclosure of German priority application No. G 7932 528.3 published Nov. 12, 1980, is hereby incorporated by reference.

What is claimed is:

1. A container suitable for the conveyance and/or storage or radioactive materials which produce gamma and neutron radiation emissions and noteworthy residual heat, said container comprising, in combination, a container body having shielding means for gamma-radiation, bar-shaped cooling fins extending from the exterior surface of said container, at least some of said cooling fins having bosses extending from the sides thereof and neutron shielding means in the form of resilient elastic molded bodies, with a said body removably disposed between an adjacent pair of cooling fins and removably held in place by said bosses on the exterior of said container.

2. A container according to claim 1 wherein a covering for the neutron shielding is secured to the bosses by fastening means.

3. A container according to claim 2 wherein the elastic molded body includes finely divided pieces of metal.

4. A container according to claim 1 wherein the elastic molded body includes finely divided pieces of metal.

5. A container according to claim 1 wherein the elastic molded body contains boron, a rare earth element.

6. A container according to claim 1 wherein the elastic molded body contains a boron compound.

7. A container according to claim 1 wherein the elastic molded body contains a rare earth compound.

* * * * *